US010033645B2

(12) United States Patent
Sane et al.

(10) Patent No.: US 10,033,645 B2
(45) Date of Patent: Jul. 24, 2018

(54) PROGRAMMABLE DATA PLANE HARDWARE LOAD BALANCING SYSTEM

(71) Applicant: Dell Products L.P., Round Rock, TX (US)

(72) Inventors: Sanjay Sane, Fremont, CA (US); Krishnamurthy Subramanian, Saratoga, CA (US)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 14/869,328

(22) Filed: Sep. 29, 2015

(65) Prior Publication Data
US 2017/0093723 A1     Mar. 30, 2017

(51) Int. Cl.
*H04L 12/803* (2013.01)
*H04L 29/06* (2006.01)
*H04L 29/08* (2006.01)

(52) U.S. Cl.
CPC ............ *H04L 47/125* (2013.01); *H04L 69/16* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 9,344,493 B1* | 5/2016 | Anand | ................. | H04L 67/1029 |
| 2002/0116397 A1* | 8/2002 | Berg | ........................ | H04L 29/06 |
| 2004/0260745 A1* | 12/2004 | Gage | ................. | H04L 29/12009 |
| | | | | 709/200 |
| 2011/0314119 A1* | 12/2011 | Kakadia | ............ | H04L 29/12066 |
| | | | | 709/213 |
| 2012/0230208 A1* | 9/2012 | Pyatkovskiy | ........... | H04L 43/10 |
| | | | | 370/250 |
| 2014/0173092 A1* | 6/2014 | Uluderya | ............ | H04L 67/1008 |
| | | | | 709/224 |
| 2014/0310418 A1* | 10/2014 | Sorenson, III | ...... | H04L 67/1002 |
| | | | | 709/226 |
| 2015/0081848 A1* | 3/2015 | Willbanks | ............... | H04L 67/02 |
| | | | | 709/219 |

OTHER PUBLICATIONS

The P4 Language Specification version 1.0.2 published Mar. 3, 2015 all pages.*

* cited by examiner

*Primary Examiner* — Brandon M Renner
(74) *Attorney, Agent, or Firm* — Haynes and Boone, LLP

(57) ABSTRACT

A programmable data plane hardware load balancing system includes a plurality of server devices and an edge networking device that is located on an edge of a local area network. The edge networking device includes programmable data plane hardware that integrates each of at least one communications port, a server device table, and a load balancing engine. The at least one communications port is coupled to the plurality of server devices. The server device table includes health information about the plurality of server devices. The load balancing engine is configured to receive traffic directed to the plurality of server devices through the at least one communication port, and has been programmed to forward the traffic to one of the plurality of server devices in response to performing health based load balancing on the traffic using the health information about the plurality of server devices in the server device table.

17 Claims, 9 Drawing Sheets

PROGRAMMABLE DATA PLANE HARDWARE LOAD BALANCING SYSTEM

BACKGROUND

The present disclosure relates generally to information handling systems, and more particularly to a system for providing load balancing in an information handling system network using programmable data plane hardware.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, front end servers, are used as load balancers to distribute workloads across multiple computing resources such as, for example, back end servers. For example, front end servers may receive resource requests from client systems and attempt to optimize back end server use, maximize throughput, minimize response times, avoid overload of any particular back end server, and/or provide other load balancing benefits known in the art. However, the use of front end server as load balancers raises a number of issues. For example, the positioning of front end servers can lead to inefficient traffic paths sometimes referred to as "traffic tromboning". Traffic tromboning can occur when front end servers are positioned at the edge of a network. For example, traffic that enters that network through one or more switches to reach the front end server may then be load balanced by the front end server and routed back through at least one of those switches again to reach the back end server.

Furthermore, the use of front end servers to perform load balancing results in a number of other inefficiencies. For example, traffic routed through a front end server must enter that front end server through its Network Interface Controller (NIC), be load balanced by the central processing unit (CPU) executing software stored on a memory device, and then be routed back through the NIC to the back end server, all which introduce latencies in the load balancing process and utilize CPU cycles of the CPU in the front end server for networking or networking services that could otherwise be used for non-networking workloads that the front end server is responsible for or capable of performing. Further still, the use of multiple front end servers as load balancers also requires those front end servers to synchronize their states using protocols such as Zookeeper, which can create further latencies.

Accordingly, it would be desirable to provide an improved load balancing system.

SUMMARY

According to one embodiment, an information handling system (IHS) includes a chassis; and programmable data plane hardware that is housed in the chassis and that integrates each of: at least one communications port that is configured to couple to a plurality of server devices; a server device table that is configured to include health information about the plurality of server devices; and a load balancing engine that is configured to receive traffic directed to the plurality of server devices through the at least one communication port, wherein the load balancing engine is programmable to forward the traffic to one of the plurality of server devices in response to performing health based load balancing on the traffic using the health information about the plurality of server devices in the server device table.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
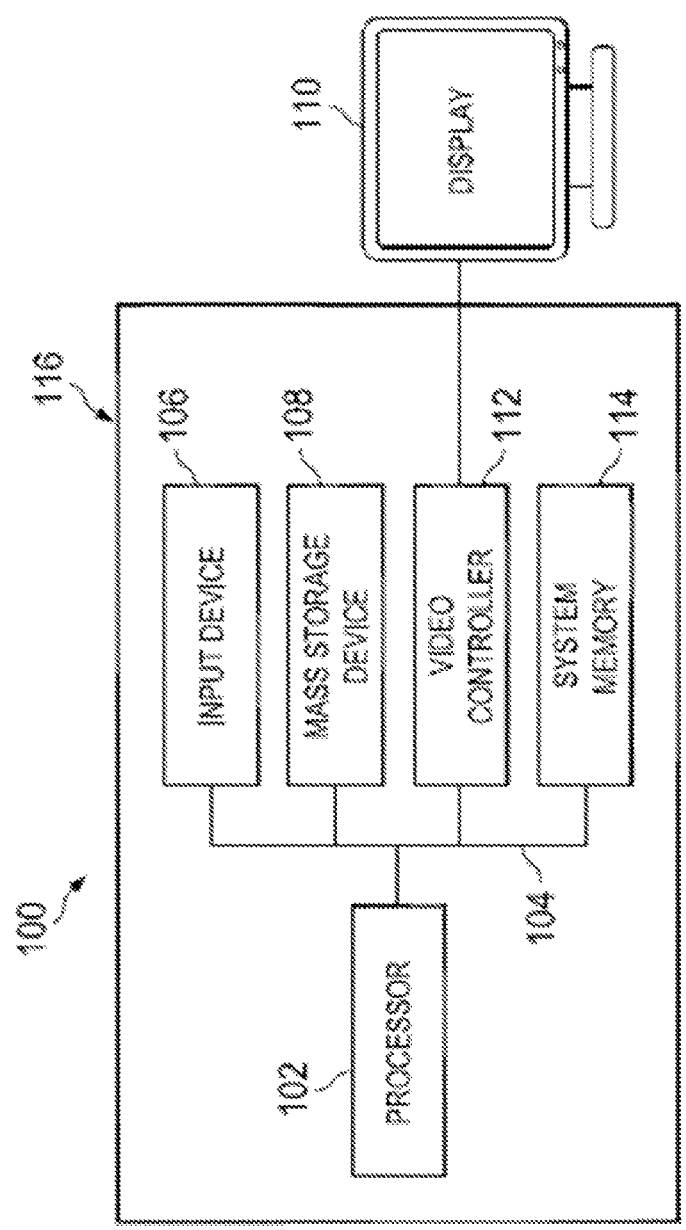
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
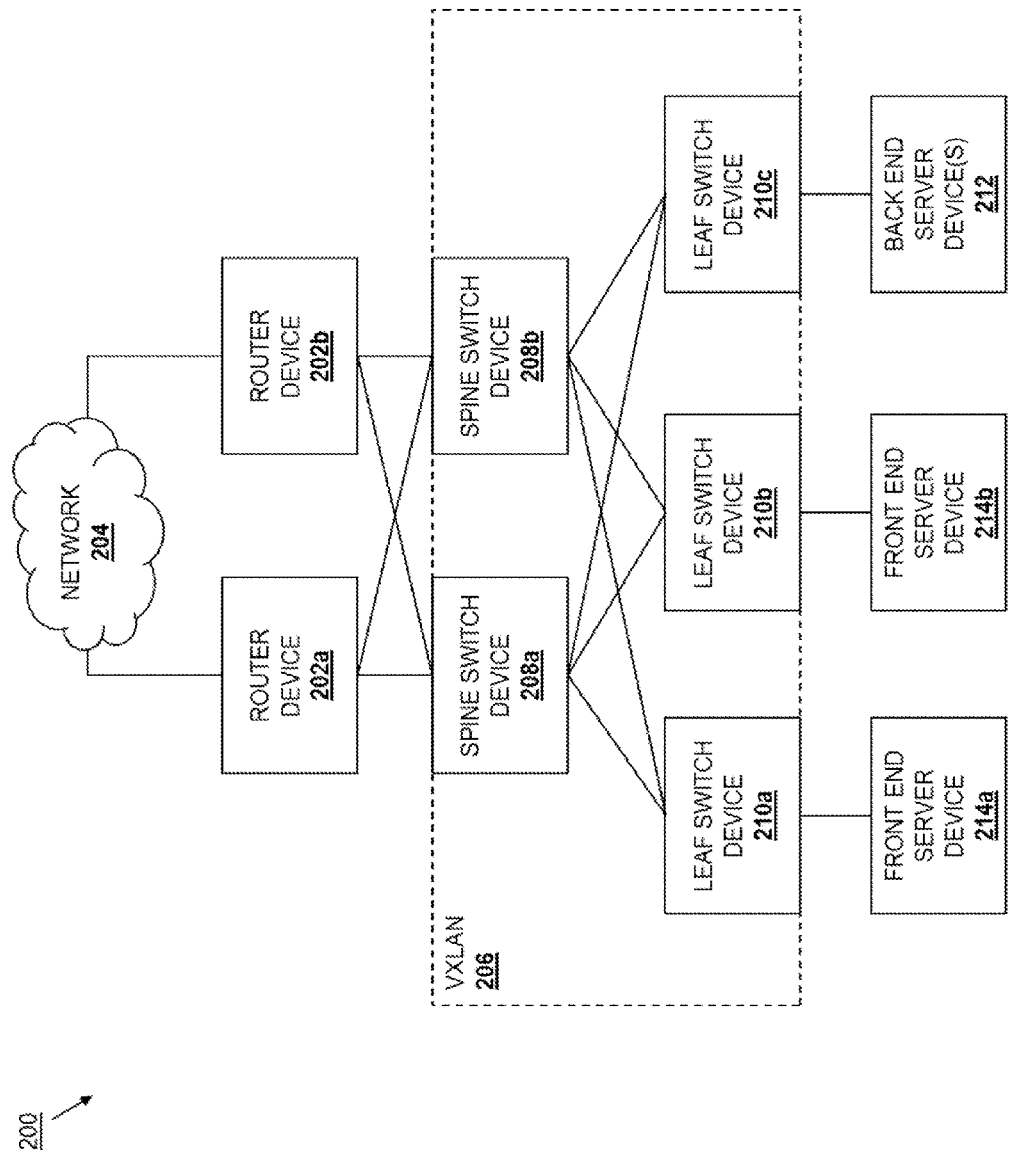
FIG. 2 is a schematic view illustrating an embodiment of a networked system.

Referring now to FIG. 2, an embodiment of a networked system 200 is illustrated. In the illustrated embodiment, the networked system 200 includes a plurality of router devices 202a and 202b that are coupled to a network 204 such as, for example, a Local Area Network (LAN), the Internet, and/or a variety of other networks known in the art. Either or both of the router devices 202a may be the IHS 100 discussed above with reference to FIG. 1 and/or may include some or all of the components of the IHS 100. In specific examples, the router devices 202a and 202b may be physical router devices, virtual edge router devices, and/or other router devices known in the art. While only two router devices 202a and 202b are illustrated, any number of router devices are envisioned as falling within the scope of the present disclosure. The router devices 202a and 202b are coupled to a virtual extensible local area network (VXLAN) 206 that includes a plurality of VXLAN nodes. In the embodiments illustrated and discussed below, the VXLAN 206 is described as a VXLAN cloud having VXLAN nodes that include spine switch devices 208a and 208b (which each are directly coupled to each of the router devices 202a and 202b) and leaf switch devices 210a, 210b, and 210c (which each are directly coupled to each of the spine switch devices 208a and 208b) that each may be the IHS 100 discussed above with reference to FIG. 1 and/or may include some or all of the components of the IHS 100, and that may each operate to route packets using, for example, Equal Cost Multi-Path (ECMP) routing algorithms and/or strategies. However, the VXLAN 206 may be provided using a variety of different devices in a variety of different configurations and using a variety of different routing algorithms and/or strategies while remaining within the scope of the present disclosure. One or more back end server device(s) 212 are coupled to the VXLAN 206 (e.g., via the coupling of the back end server device(s) 212 to the leaf switch device 210c in the illustrated embodiment). The back end server device(s) 212 may each be the IHS 100 discussed above with reference to FIG. 1 and/or may include some or all of the components of the IHS 100, and as discussed below may operate as resource server(s) (e.g., web servers) that provide resources to client systems.

A plurality of front end server devices 214a and 214b are coupled to the routing sub-network 206 via a coupling between the front end server device 214a and the leaf switch device 210a, and a coupling between the front end server device 214b and the leaf switch device 210b. The front end server devices 214a and 214b may each be the IHS 100 discussed above with reference to FIG. 1 and/or may include some or all of the components of the IHS 100. In the illustrated embodiment, the front end server devices 214a and 214b and the back end server devices 212 originate and terminate the VXLAN cloud. As discussed below, in conventional systems the front end server devices 214a and 214b may provide load balancer devices that operate to distribute workloads across the back end server(s) 212 by receiving resource requests from client systems and attempting to retrieve responses to those requests while optimizing back end server use, maximize throughput, minimize response times, avoid overload of any particular back end server, and/or provide other load balancing benefits known in the art. As such, the front end server devices 214a and 214b may receive requests from client systems and satisfy those requests using the back end server device(s) 212 based on load, processing power, and/or other factors known in the art. However, as discussed above, the performance of such load balancing operations by the front-end server devices leads to issues such as traffic tromboning, latencies, and the utilization of the front end servers 214a and 214b for networking or networking services when they could otherwise be used for non-networking workloads. While the front end server devices 214a and 214b and the back end server devices 212 are distinguished in FIG. 2 for the purposes of discussing the difference between conventional load balancing systems and the systems of the present disclosure, embodiments of the present disclosure allow the front end server devices 214a and 214b to be utilized in substantially the same manner as the back end server devices 212 as discussed below.

Figure 3:
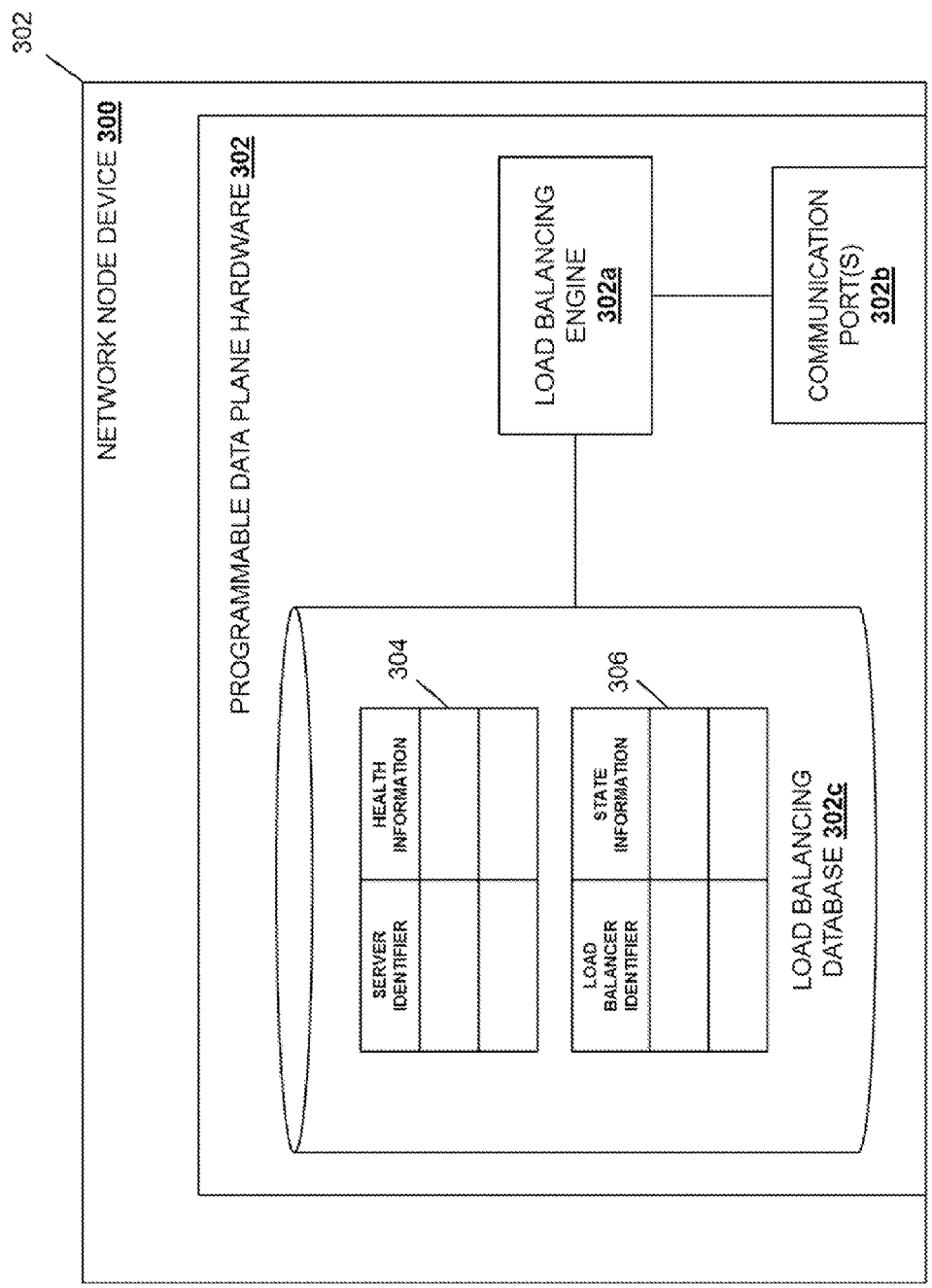
FIG. 3 is a schematic view illustrating an embodiment of a network node device that may be provided in the networked system of FIG. 2.

Referring now to FIG. 3, an embodiment of a network node device 300 is illustrated. As discussed below, the network node device 300 may be provided as any of the VXLAN nodes in the VXLAN 206 (e.g., the spine switch devices 208a and 208b; the leaf switch devices 210a, 210b, and 210b; etc) discussed above with reference to FIG. 2 in order to provide the programmable data plane hardware load balancing system of the present disclosure. As such, the network node device 300 may be the IHS 100 discussed above with reference to FIG. 1 and/or may include some or all of the components of the IHS 100. In the illustrated embodiment, the network node device 300 includes a chassis 302 that houses the components of the network node device 300. The chassis 302 houses programmable data plane hardware 302 that provides an programmable integrated device that includes one or more communication ports 302a, a load balancing engine 302b, and a load balancing database 302c. In an embodiment, the programmable data plane hardware 302 may utilize a domain specific, protocol and target independent, and field reconfigurable programming language that describes the data plane of a network and allows for the expression of forwarding functions for translation into hardware and firmware such as, for example, the P4 language provided by the P4 Language Consortium and available at www.P4.org.

As would be understood by one of skill in the art in possession of the present disclosure, the programmable data plane hardware 302 provide benefits over Application Specific Integrated Circuits (ASICs) due to its ability to be reprogrammed in the field to perform different functions, while also providing benefits over CPU/software systems that may have their software reprogrammed such that CPU performs different functions but that suffer from latencies resulting from the need to retrieve the software instructions from a memory device and send and receive data through a NIC. As discussed below, the reprogrammable integrated device provided by the programmable data plane hardware 302 provides several specific benefits in the programmable data plane hardware load balancing system that solve several problems that occur in conventional load balancing systems. For example, the P4 language discussed above may be used with programmable hardware primitives to provide the programmable data plane hardware 302 and construct networking (e.g., switching/routing) hardware that implements load balancing operations including the retrieval of health information from the back end server devices 212, the performance of Equal Cost Multi-Path (ECMP)/weighted ECMP techniques for load balancing, the generation of routing and virtual Internet Protocol (vIP) advertisements, the provisioning of state synchronization information, and the provisioning of fast failover that is inline and at hardware data rates.

In the embodiments discussed below, the communication port(s) 302a that are integrated into the programmable data plane hardware 302 are configured to couple to a network and, as such, may include Ethernet ports, Fibre Channel ports, and/or a variety of other communication ports known in the art. In the embodiments discussed below, the load balancing engine 302a that is integrated into the programmable data plane hardware 302 is coupled to the communication port(s) 302a and may be programmed to perform the functions of the load balancing engines and network node devices discussed below. In the embodiments discussed below, the load balancing database 302c that is integrated into the programmable data plane hardware 302 is coupled to the load balancing engine 302c and may include a server device table 304 that is used to track the health of servers in the programmable data plane hardware load balancing system 200, and a load balancer state table 306 that is used to track the states of other load balancing devices in the data plane hardware load balancing system 200. While specific integrated components for the programmable data plane hardware 302 are illustrated and described below, other integrated components may be integrated into the programmable data plane hardware 302 while remaining within the scope of the present disclosure. Furthermore, one of skill in the art in possession of the present disclosure will recognize that the network node device 300 may include other components that will provide for conventional networking functionality while remaining within the scope of the present disclosure.

Figure 4:
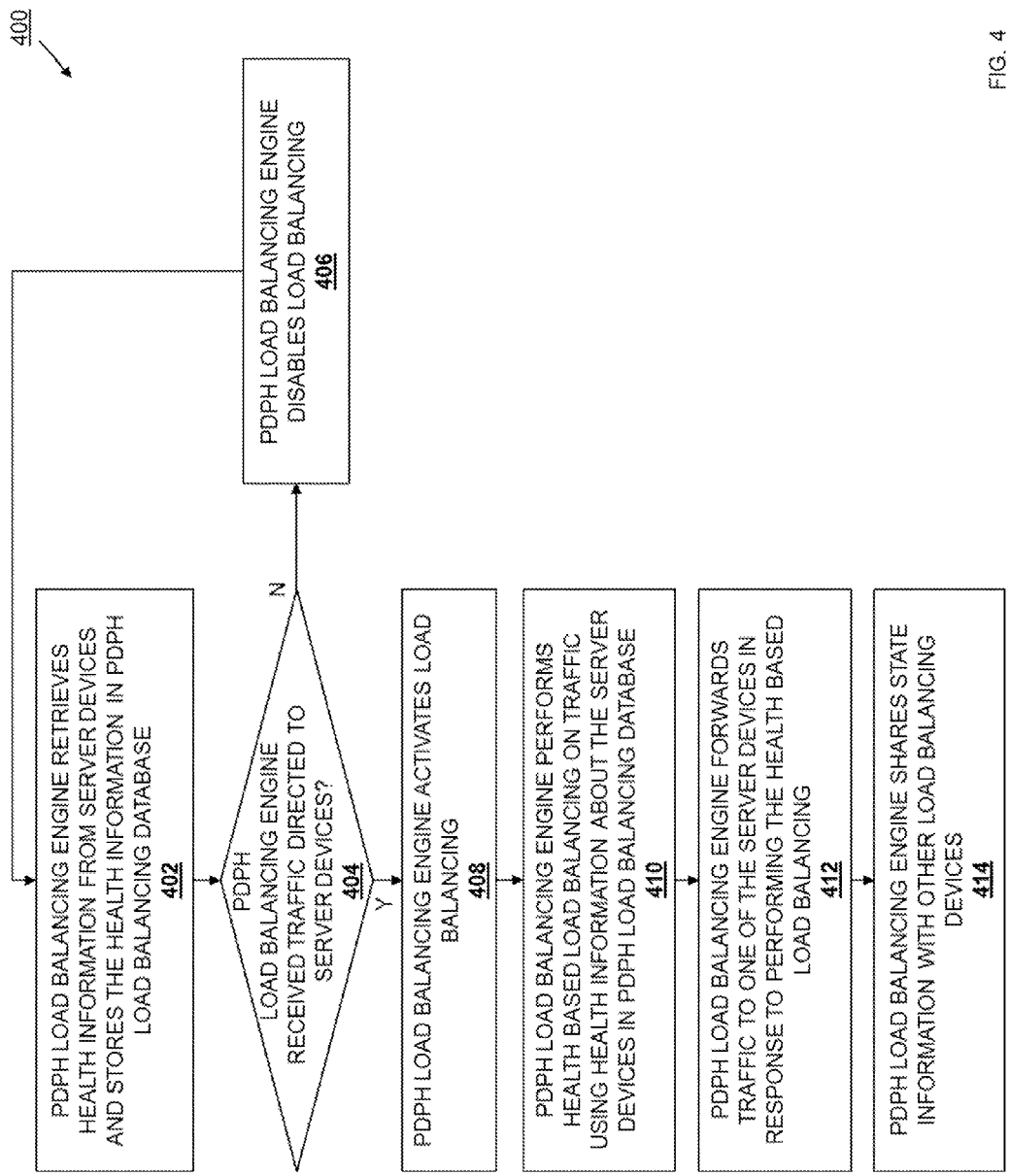
FIG. 4 is a flow chart illustrating an embodiment of a method for performing programmable data plane hardware load balancing.

Referring now to FIG. 4, an embodiment of a method 400 for performing programmable data plane hardware load balancing is illustrated. As discussed above, conventional load balancing systems suffer from a number of deficiencies.

Figure 5A:
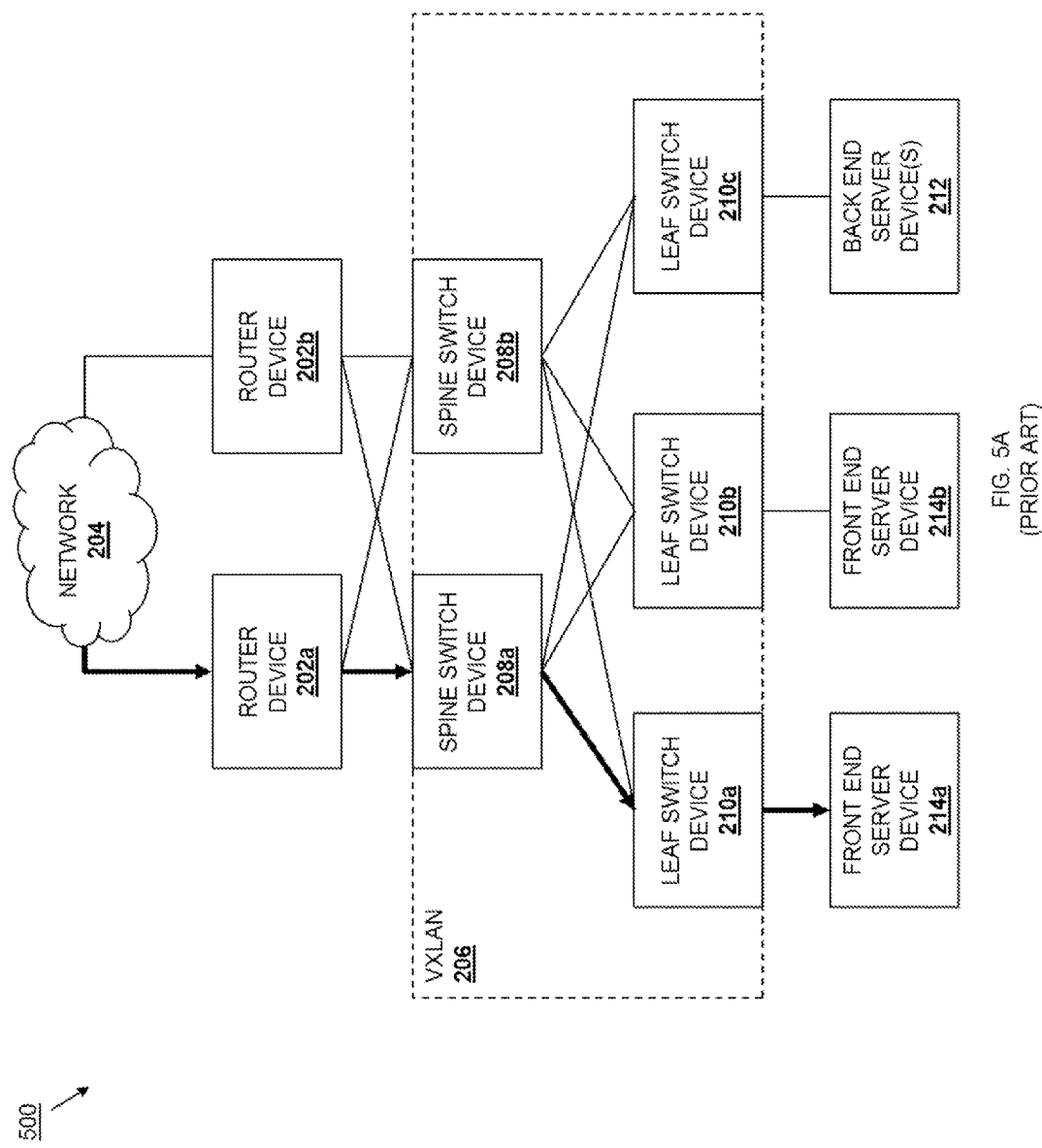
FIG. 5A is a schematic view illustrating an embodiment of the operation of a conventional load balancing system using the networked system of FIG. 2.
Figure 5B:
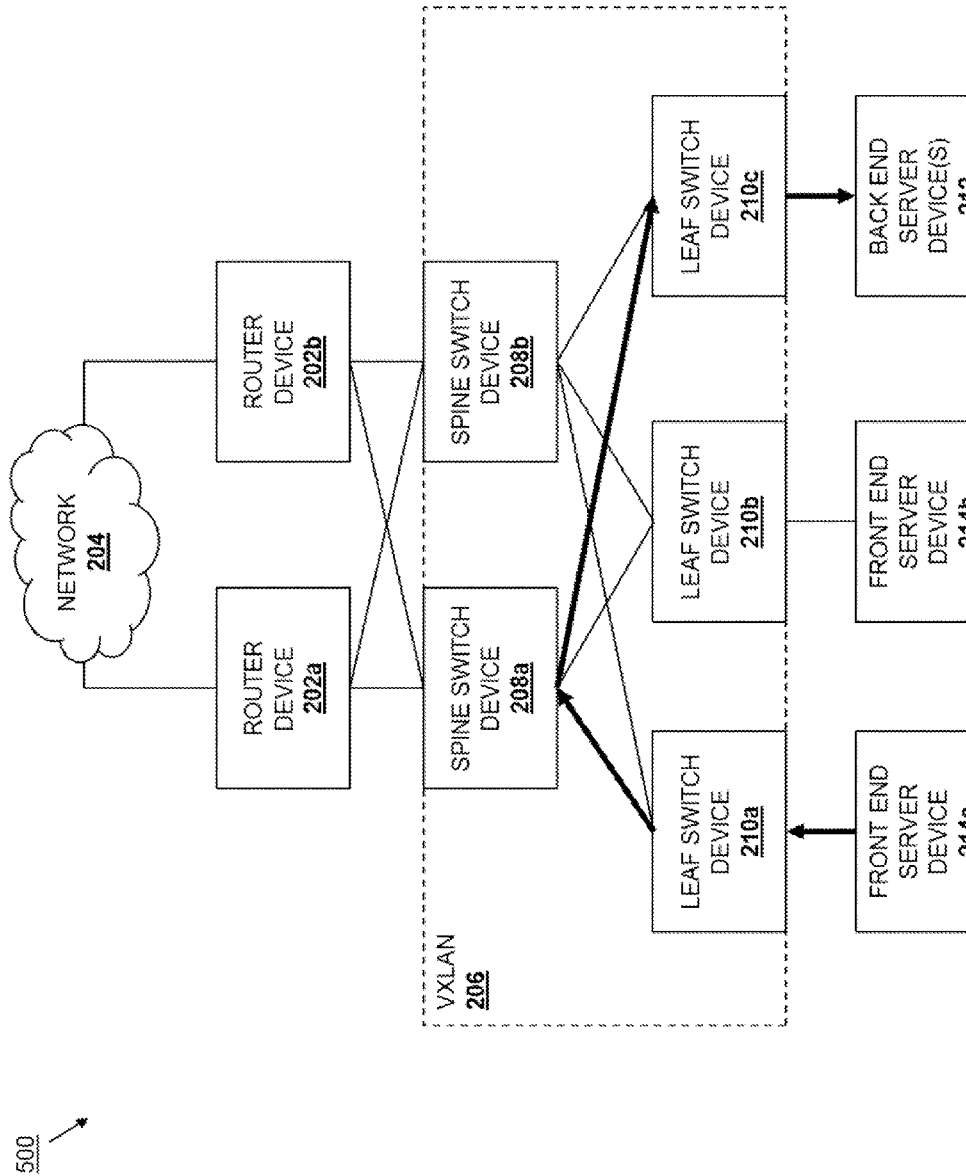
FIG. 5B is a schematic view illustrating an embodiment of the operation of the conventional load balancing system of FIG. 5A.

For example, FIGS. 5A and 5B illustrate the networked system 200 of FIG. 2 implementing a conventional load balancing system 500 in which the front end server devices 214a and 214b act as load balancers to distribute workloads across the back end server device(s) 212. As discussed above, the front end server devices 214a and 214b may provide service appliances and/or virtual appliances that use CPUs to run load balancing logic in software to receive resource requests from client systems (not illustrated, but connected to the network 204) and attempt to optimize the use of the back end server device(s) 212, maximize throughput, minimize response times, avoid overload of any particular back end server device(s) 212, and/or provide other load balancing benefits known in the art. FIG. 5A illustrates a communication path of traffic (illustrated by bolded arrows) received through the network 204 by the router device 202a, forwarded to the spine switch device 208a, forwarded by the spine switch device 208a to the leaf switch device 210a, and forwarded by the left switch device 210a to the front end server device 214a. In an embodiment, the front end server devices 214a and 214b may terminate the same vIP and load balance that vIP at the same time, while the back end sever devices 212 may provide webservers, database servers, and/or other back end server devices that do the "real" work for a given workload (as opposed to the networking work performed by the front end server devices 214a and 214b).

However, as discussed above, the use of front end server 214a as a load balancer can raise a number of issues. For example, the positioning of the front end server 214a can lead to inefficient traffic paths sometimes referred to as "traffic tromboning", which may occur due to the front end server 214a being positioned at the edge of the networked system 200 such that the traffic entering the networked system 200 through the VXLAN 206 traverses one or more of the VXLAN nodes to reach the front end server 214a (e.g., as illustrated in the communication path of FIG. 5A), and then is load balanced by the front end server 214a and routed back through at least one of those VXLAN nodes again to reach the back end server(s) 212. FIG. 5B illustrates a communication path of traffic (illustrated by bolded arrows) load balanced by the front end server device 214a and forwarded back to the leaf switch device 210a, forwarded by the leaf switch device 210a back to the spine switch device 208a, forwarded by the spine switch device 208a to the leaf switch device 210c, and forwarded by the left switch device 210b to the back end server device(s) 212. One of skill in the art in possession of the present disclosure will recognize that the communication paths of FIGS. 5A and 5B illustrate how the use of the front end server device 214a as a load balancer can result in traffic tromboning where the traffic traverses the spine switch device 208a and the leaf switch device 210a twice in order to be delivered to the back end server device(s) 212. Furthermore, one of skill in the art will recognize that the communication paths of FIGS. 5A and 5B provide a very simplified example of traffic tromboning, and in practice traffic tromboning may result in traffic traversing particular devices more than twice and thus being provided to the back end server device(s) 212 even more inefficiently than is illustrated in FIGS. 5A and 5B.

Furthermore, as also discussed above, the use of the front end server device 214a to perform load balancing can result in a number of other inefficiencies. For example, traffic routed through the front end server device 214a for load balancing as illustrated in FIGS. 5A and 5B must enter the front end server device 214a through its NIC, be load balanced by its CPU executing software stored in its memory system, and then be routed back through its NIC to the back end server device(s) 212, and this CPU/NIC "handshake" introduces latencies in the load balancing process. Furthermore, the utilization of the front end server device 214a for networking or networking services prevents the front end server device 214a from otherwise being used for non-networking workloads ("real" workloads rather than infrastructure cost workloads) that the front end server 214a is responsible for or capable of performing (i.e., similarly to the back end server device(s) 212). Further still, the use of both front end server device 214a and 214b as load balances also requires the front end server device(s) 214a and 214b to synchronize their states for each new connection or flow, which can create further latencies. Thus, while the use of the CPU and/or CPU cores in the front end server devices 214a and 214b is conventionally thought to be more flexible, a number of problems are associated with doing so.

The systems and methods of the present disclosure remedy these deficiencies by providing the network node device 300 as one or more of the VXLAN nodes in the VXLAN 206, and having the network node device(s) 300 perform load balancing via its programmable data plane hardware 302. As discussed below, the use of the programmable data plane hardware 302 to perform load balancing in the VXLAN nodes prevents the inefficient traffic paths/traffic tromboning issues that occur in conventional load balancing systems, removes the latencies associated with CPU/software load balancing via the NICs in the front end servers 214a and 214b, while also relieving the front end server devices 214a and 214b of load balancing duties such that those front end server devices 214a and 214b may operate instead as the back end servers 212 to perform workloads and other non-networking functions.

Figure 6:
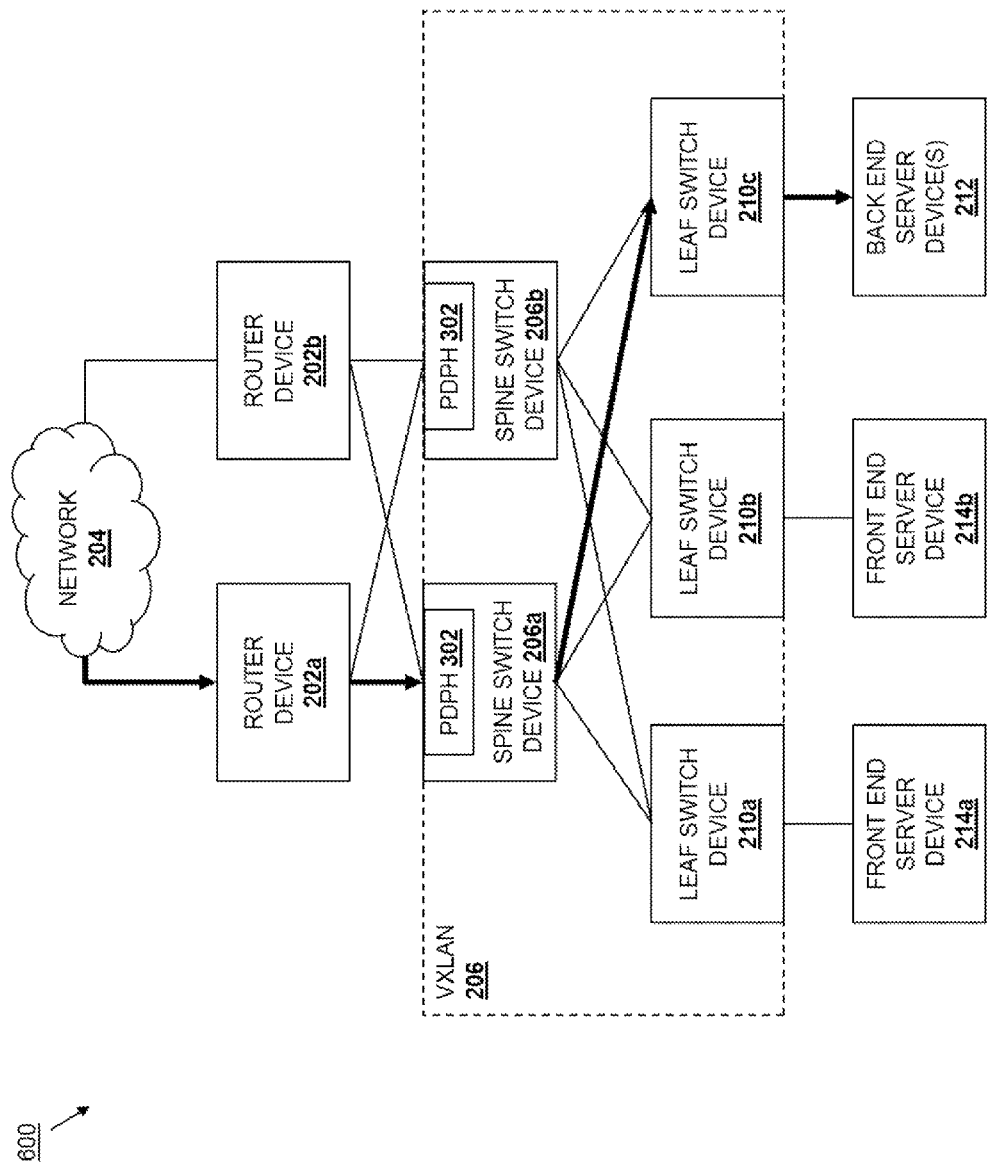
FIG. 6 is a schematic view illustrating an embodiment of the operation of a programmable data plane hardware load balancing system using the network node device of FIG. 3 in the networked system of FIG. 2.
Figure 7:
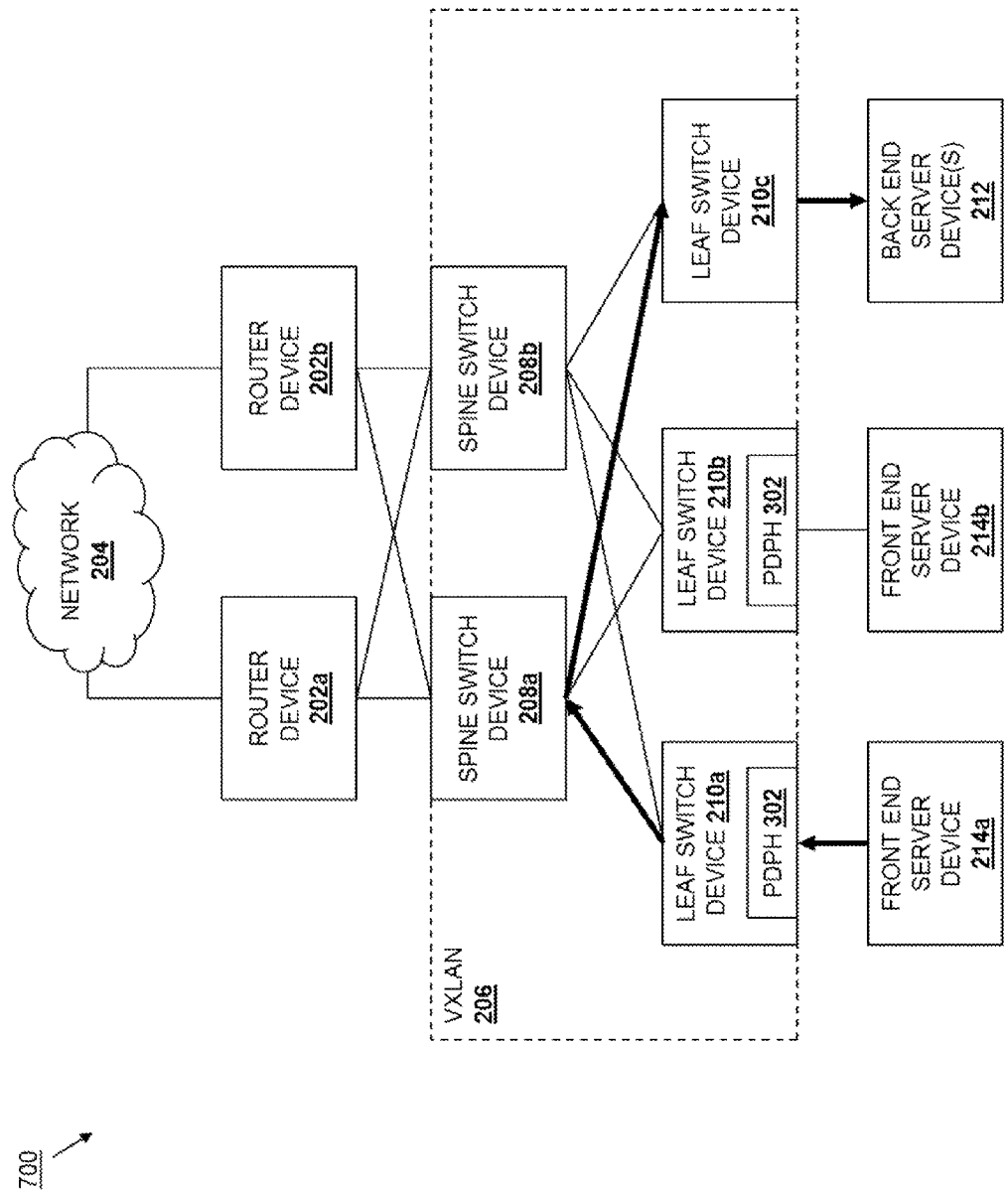
FIG. 7 is a schematic view illustrating an embodiment of the operation of a programmable data plane hardware load balancing system using the network node device of FIG. 3 in the networked system of FIG. 2.

FIG. 6 illustrates an embodiment of a programmable data plane hardware load balancing system 600 that may be utilized for network-to-server-device communications (also referred to as "north/south" communications). In such embodiments, the spine switch devices 206a and 206b, which are positioned on the edge of the VXLAN 206 where traffic from the network 204 enters the VXLAN 206 from the router devices 202a and 202b, are provided by network node device(s) 300 having the programmable data plane hardware 302. FIG. 7 illustrates a programmable data plane hardware load balancing system 700 that may be utilized for server-device-to-server-device communications (also referred to as "east/west" communications). In such embodiments, the leaf switch devices 210a and 210b, which are positioned on the edge of the VXLAN 206 where traffic enters the VXLAN 206 from the front end server devices 214a and 214b, are provided by network node device(s) 300 having the programmable data plane hardware 302. As such, the network node device(s) 300 in the programmable data plane hardware load balancing systems 600 and 700 may be considered edge networking devices located on the edge of the VXLAN 206.

The method 400 begins at block 402 where the programmable data plane hardware (PDPH) load balancing engine retrieves health information from server devices and stores the health information the programmable data plane hardware load balancing database. In an embodiment, the load balancing engine 302a integrated in the programmable data plane hardware 302 of a network node device 300 that is provided as a VXLAN node (e.g., the spine switch devices 208a and 208b in FIG. 6; the leaf switch devices 210a and 210b in FIG. 7) may operate to retrieve health information from the back end server device(s) 212 (via the communication port(s) 302b integrated in the programmable data plane hardware 302) and store that health information in the server device table 304 of the load balancing database 302c integrated in the programmable data plane hardware 302. For example, a "ping pong" protocol may be utilized by the load balancing engine 302a in the network node devices 300 and the back end server devices 212 that relays health information about the back end server devices 212 to the load balancing engine 302a. Examples of health information for the back end server devices 212 may include processing system utilization in the back end server devices 212, memory utilization in the back end server devices 212, communication bandwidth of the back end server devices 212, and/or a variety of other server device health information known in the art.

In an embodiment, the retrieval of the health information of the back end server devices 212 by the load balancing engines 302a in the network node devices 300 may be performed periodically over any time intervals necessary to keep the network node devices 300 updated on the health of the back end server devices 212 such that the load balancing functionality discussed below may be enabled. Health information retrieved from the back end server devices 212 may be stored by the load balancing engine 302a in the server device table 304 of the load balancing database 302c (e.g., by associating a server identifier of each back end server 212 and the health information retrieved from that back end server 212), and one of skill in the art in possession of the present disclosure will recognize that such associations allow the load balancing engine 302a to maintain a pool of back end server devices 212 whose health may be continually updated and monitored.

The method 400 the proceeds to decision block 404 where the programmable data plane hardware load balancing engine determines whether it has received traffic directed to the server devices. As discussed below, the load balancing engines 302a integrated in the programmable data plane hardware 302 of the networking node devices 300 may be configured to enable and disable load balancing functionality based on whether such load balancing functionality is needed in the programmable data plane hardware load balancing system. As such, the performance of load balancing by network node devices 300 in the programmable data plane hardware load balancing system may be dynamically adjusted based on traffic received, as well as based on other network parameters, traffic changes, and/or factors that may result in the activation or disablement of load balancing functionality in any of the network node devices 300 in the VXLAN 206. In a specific example, the leaf switch device 210c in FIG. 7 may not act as a load balancer unless programmable data plane hardware 302 in the leaf switch devices 210c (not illustrated) receives traffic from the back end server devices 212 that is directed to one of the front end server devices 214a or 214b. In an embodiment of decision block 404, the load balancing engine 302a in any network node device 300 acting as a VXLAN node may receive traffic and determine whether that traffic is directed to the back end server devices 212.

FIG. 6 illustrates an embodiment of the spine switch device 206a receiving traffic (illustrated by the bolded arrows) from the network 204 through the router device 202a via its programmable data plane hardware 302. At decision block 404, the load balancing engine 302a integrated in the programmable data plane hardware 302 may determine whether that traffic is directed to the back end server devices 212. For example, traffic directed to the back end server devices 212 may include traffic provided by a client system connected to the network 204 to retrieve some application, resource, or other information provided by the back end server devices 212, while traffic not directed to the back end server devices 212 may include traffic received from the back end server devices 212 and directed out to the network 204. FIG. 7 illustrates an embodiment of the leaf switch device 210a receiving traffic (illustrated by the bolded arrows) from the front end server device 214a via its programmable data plane hardware 302. At decision block 404, the load balancing engine 302a integrated in the programmable data plane hardware 302 may determine whether that traffic is directed to the back end server devices 212. For example, traffic directed to the back end server devices 212 may include traffic provided by the front end server device 214a to retrieve some application, resource, or other information provided by the back end server devices 212, while traffic not directed to the back end server devices 212 may include traffic received from the front end server device 214a and directed out to the network 204.

If, at decision block 404, the programmable data plane hardware load balancing engine determines that the received traffic is not directed to the back end server devices 212, the method 400 proceeds to block 406 where the programmable data plane hardware load balancing engine disables load balancing. In an embodiment, at block 406, the load balancing engine 302a integrated in the programmable data plane hardware 302 of a network node device 300 acting as a VXLAN node may disable (or not enable) load balancing functionality if it is not receiving traffic directed to the back end server devices 212. As such, the spine switch devices 206a and 206b of FIG. 6 may not act as load balancers until traffic is received from the network 204 that is directed to the back end server devices 212, and the leaf switch devices 210a and 210b of FIG. 7 may not act as load balancers until traffic is received from the front end server devices 214a and 214b that is directed to the back end server devices 212. The method 400 may then return to block 402 and loop through blocks 404 and 406 until traffic is received that is directed to the back end server devices 212.

If, at decision block 404, the programmable data plane hardware load balancing engine determines that the received traffic is directed to the back end server devices 212, the method 400 proceeds to block 408 where the programmable data plane hardware load balancing engine activates load balancing. In an embodiment, at block 408, the load balancing engine 302a integrated in the programmable data plane hardware 302 of a network node device 300 acting as a VXLAN node may enable (or not disable) load balancing functionality if it receives traffic directed to the back end server devices 212. As such, the spine switch devices 206a and 206b of FIG. 6 may act as load balancers when traffic is received from the network 204 that is directed to the back end server devices 212, and the leaf switch devices 210a and 210b of FIG. 7 may act as load balancers when traffic is received from the front end server devices 214a and 214b that is directed to the back end server devices 212.

The method 400 then proceeds to block 410 where the programmable load balancing engine performs health based load balancing on traffic using the health information about the server devices in the programmable load balancing database. In an embodiment of block 410, the load balancing engine 302a integrated in the programmable data plane hardware 302 of the networking node devices 300 acting as VXLAN nodes may track each of the connections (e.g., transport control protocol (TCP) connections, flows, and/or other communications) it provides to each of the back end server devices 212 (e.g., by tracking the establishment of those connections, the tear down of those connections, etc.). For each connection, the load balancing engine 302a may perform health based load balancing using the health information for the back end server devices 212 that is stored in the server device table 304 of the load balancing database 302c. As such, the load balancing engine 302a may load balance the traffic/connections based on the processing system utilization of each of the back end server devices 212, the memory system utilization of each of the back end server devices 212, the communication bandwidth of each of the back end server devices 212, and/or using any other back end server device health information known in the art to optimize the use of the back end server device(s) 212, maximize throughput, minimize response times, avoid overload of any particular back end server device(s) 212, and/or provide other load balancing benefits known in the art. In an embodiment, the health based load balancing may be performed using weighted round robin load balancing and/or other load balancing algorithms known in the art, and results in the selection by the load balancing engine 302a of one of the back end server devices 212 to which the traffic should be forwarded.

The method 400 then proceeds to block 412 where the programmable data plane hardware load balancing engine forwards traffic to one of the server devices in response to performing the health based load balancing. In an embodiment, the load balancing engine 302a integrated in the programmable data plane hardware 302 of the network node device 300 acting as a VXLAN node forwards the traffic received at decision block 404 to one of the back end server devices 212 determined using the health based load balancing at block 410. FIG. 6 illustrates the embodiment of the spine switch device 206a forwarding the traffic (illustrated by the bolded arrows) received from the network 204 through the router device 202a via its programmable data plane hardware 302. At block 412, the load balancing engine 302a forwards that traffic to the back end server device 212 determined at block 410 through the leaf switch device 210c. FIG. 7 illustrates the embodiment of the leaf switch device 210a forwarding the traffic (illustrated by the bolded arrows) received from the front end server device 214a via its programmable data plane hardware 302. At block 412, the load balancing engine 302a forwards that traffic to the back end server device 212 determined at block 410 through the spine switch device 208a and the leaf switch device 210c.

With reference back to the discussion of FIGS. 5A and 5B, one of skill in the art in possession of the present disclosure will recognize that the programmable data plane hardware load balancing system 600 of FIG. 6 provides substantial improvement over the conventional load balancing system discussed in FIGS. 5A and 5B by eliminating traffic tromboning issues. For example, instead of the spine switch device 208a forwarding the traffic through the leaf switch device 210a to the front end server device 214a acting as a load balancer, only to receive that traffic back from the front end server device 214a through the leaf switch device 210a so that it can forward that traffic to one of the back end server devices 212 as illustrated in FIGS. 5A and 5B, the programmable data plane hardware 302 in the spine switch device 206a of FIG. 6 may perform load balancing in order to forward the traffic to one of the back end server devices 212 through the leaf switch device 210c, thus providing an improved traffic path. Similarly, the programmable data plane hardware 302 in the leaf switch device 210a of FIG. 7 may perform load balancing in order to forward the traffic to one of the back end server devices 212 through the spine switch device 208a and the leaf switch device 210c to provide the most efficient traffic path from the front end server device 214a to the back end server devices 212.

Furthermore, the use of the programmable data plane hardware 302 greatly reduces latencies associated with the need to route traffic through a NIC for load balancing by a CPU executing software instructions stored in memory, and then route that load balanced traffic back through its NIC. Instead, the integrated load balancing engine 302a, communications port(s) 302b, and load balancing database 302c in the programmable data plane hardware 302 provides for the performance of load balancing in hardware at packet and TCP connection rates, thus greatly reducing the latencies associated with conventional CPU/software and NIC based load balancing. Finally, the offloading of load balancing operations from the front end server devices 214a and 214b allows those front end server devices 214a and 214b to operate similarly to the back end servers 212 instead of performing networking operations, thus increasing the number of "real" workloads (i.e., non-networking workloads) that can be processed by the system and increasing the efficiency of the datacenter. One of skill in the art in possession of the present disclosure will recognize that these are just some of the benefits realized by the systems and methods of the present disclosure.

The method 400 may then proceed to block 414 where the programmable data plane hardware load balancing engine shares state information with other load balancing devices. As discussed above, the load balancing engine 302a integrated in the programmable data plane hardware 302 of a network node device 300 may track each of the connections (e.g., TCP connections, flows, and/or other communications) it provides to each of the back end server devices 212. Each of those connection/flow states may be shared by the load balancing engine 302a with other load balancing devices in the programmable data plane hardware load balancing system. For example, with reference to FIG. 6, the load balancing engine 302a integrated in the programmable data plane hardware 302 in the spine switch device 206a may share its state information at packet/connection rates with the load balancing engine 302a integrated in the programmable data plane hardware 302 in the spine switch device 206b. Similarly, with reference to FIG. 7, the load balancing engine 302a integrated in the programmable data plane hardware 302 in the leaf switch device 210a may share its state information at packet/connection rates with the load balancing engine 302a integrated in the programmable data plane hardware 302 in the leaf switch device 210b.

A load balancing engine 302a that receives or retrieves state information from another load balancing engine 302a in the programmable data plane hardware load balancing system may then store that state information in the load balancer state table 306 in its load balancing database 302c (e.g., by associated a load balancer identifier (e.g., a Media Access Controller (MAC) address) that identifies the network node device acting as a load balancer with that state information). One of skill in the art in possession of the present disclosure will recognize that the load balancer state table 306 may allow a load balancing engine 302b to take over for another load balancer device in the programmable data plane hardware load balancing system if that load balancer device goes down, a link used by that load balancer goes down, a change in the VXLAN 206 occurs, and/or in response to a variety of other scenarios known in the art. Furthermore, the use of the programmable data plane hardware 302 provides almost instant failover and substantial improvements over conventional load balancing systems. For example, in conventional load balancing systems, if the front end server device acting as a load balancer fails, that failure must be detected by a switch and communicated to all other switches in the VXLAN cloud so that that front end server device may be removed from forwarding databases. In the programmable data plane hardware load balancing systems of the present disclosure, when a network node device 300 acting as an edge networking device fails, the router device is already aware of the other edge networking devices and may simply forward the traffic to those devices (while also removing the vIP handled by the failed edge networking device).

Figure 8:
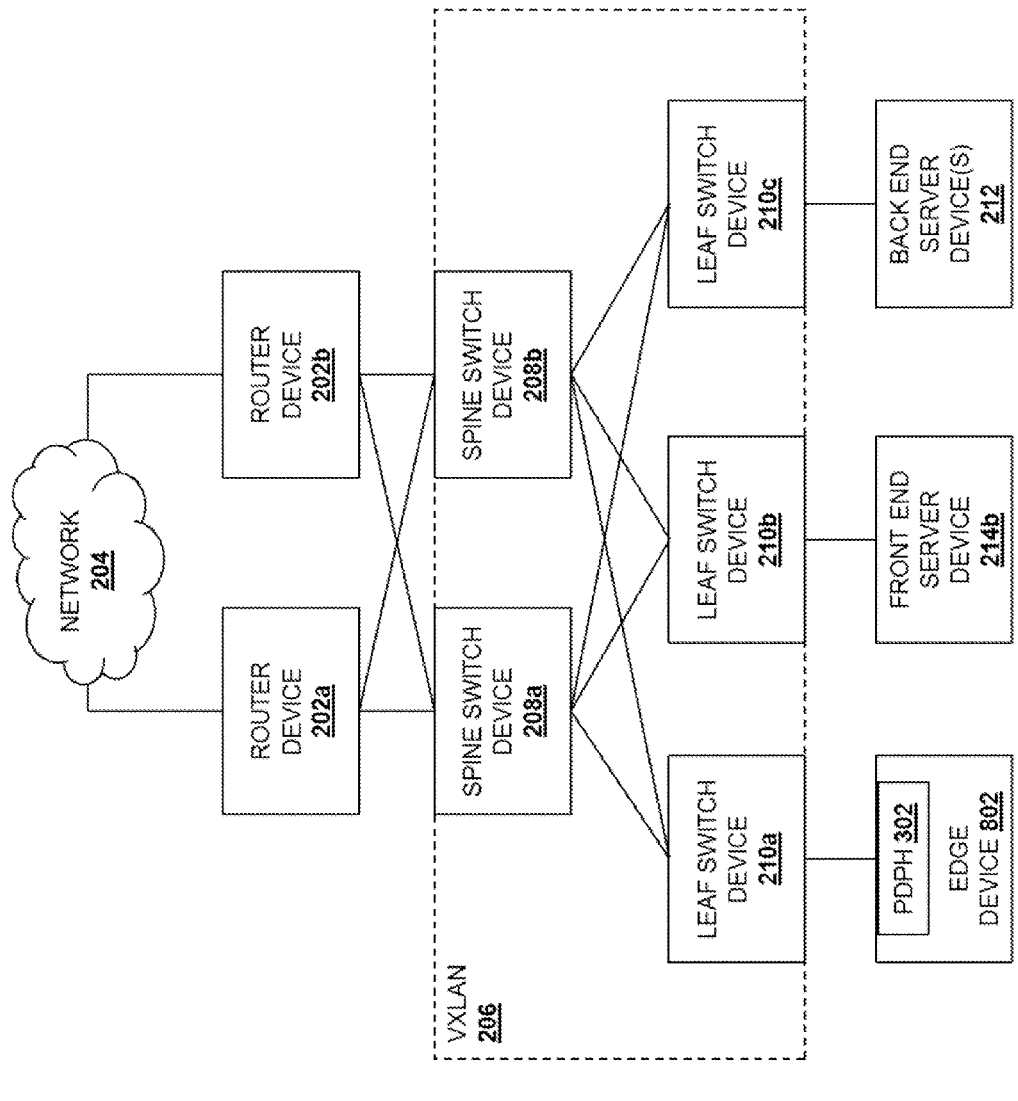
FIG. 8 is a schematic view illustrating an embodiment of a programmable data plane hardware load balancing system using the network node device of FIG. 3 in the networked system of FIG. 2.

Thus, systems and methods have been described that utilize programmable data plane hardware in network node devices that are positioned at the edge of a network and that are used to route traffic to back end server devices in order to perform optimized load balancing on traffic that enters that network and that is directed to the back end server devices. The provisioning of load balancing in such a manner offloads load balancing from server devices, thus allowing those server devices to perform back end server functions, while also providing for much more efficient and faster load balancing operations and eliminating traffic tromboning issues that can occur when server devices are used to load balance. However, the network node devices including the programmable data plane hardware of the present disclosure may be provided in different configurations that do not realize all the benefits discussed above. For example, FIG. 8 illustrates a programmable data plane hardware load balancing system 800 in which the network node device 300 has been provided as an edge device 802 (e.g., replacing the front end server 214a in the networked system 200 of FIG. 2) and includes the programmable data plane hardware 302 that operates substantially as discussed above. While one of skill in the art in possession of the present disclosure will recognize that the programmable data plane hardware load balancing system 800 may be subject to the traffic tromboning issues discussed above, the use of the programmable data plane hardware 302 in the edge device 802 to perform load balancing operations will still benefit from the more efficient and quicker load balancing enabled by the programmable data plane hardware 302, and will still offload load balancing operations from the front end server device 214b such that the front end server device 214b may perform back end server device operations. As such, a plurality of the edge devices 802 may be provided in place of the front end server devices 214a and 214b in the networked system 200 to provide a load balancing system that does not suffer from many of the latencies of conventional load balancing systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A programmable data plane hardware load balancing system, comprising:
   a plurality of server devices;
   a first switch device that is located on an edge of a local area network and that is configured to perform network switch functions in the local area network, wherein the first switch device includes programmable hardware primitives and utilizes a domain specific, protocol independent, target independent, and field reconfigurable programming language to provide programmable data plane hardware that integrates each of:
  at least one communications port that is coupled to the plurality of server devices;
  a server device table including health information about the plurality of server devices; and
  a load balancing engine that is configured to:
    receive data plane traffic that is directed to the plurality of server devices through the at least one communication port;
    determine that a source of the data plane traffic that is directed to the plurality of server devices enables load balancing functionality and, in response, perform health based load balancing on the data plane traffic using the health information about the plurality of server devices in the server device table; and
    forward, based on the health based load balancing, the data plane traffic to one of the plurality of server devices; and
  a second switch device that is coupled to the first switch device, wherein the load balancing engine is further configured to:
    disable load balancing functionality when the source of the data plane traffic is the second switch device; and
    perform the network switch functions to forward the data plane traffic.

2. The programmable data plane hardware load balancing system of claim 1, further comprising:
  a router device coupled to the first switch device, wherein the load balancing engine receives the data plane traffic through the communication port from the router device, and wherein the router device is the source of the data plane traffic that enables load balancing functionality.

3. The programmable data plane hardware load balancing system of claim 1, wherein the load balancing engine receives the data plane traffic through the communication port from a first server device of the plurality of server devices and the first server device is the source of the data plane traffic that enables load balancing functionality, and wherein the load balancing engine has been programmed to forward the data plane traffic to a second server device of the plurality of server devices in response to performing the health based load balancing on the data plane traffic.

4. The programmable data plane hardware load balancing system of claim 1, further comprising:
  a second switch device coupled to the first switch device, wherein the load balancing engine is configured to:
    store state information related to the forwarding of the data plane traffic to the one of the plurality of server devices; and
    forward the state information to the second switch device.

5. The programmable data plane hardware load balancing system of claim 1, wherein the health information about the plurality of server devices includes Transport Control Protocol (TCP) connection information describing the number of TCP connections provided for each of the plurality of server devices.

6. An information handling system (IHS), comprising:
  a chassis; a processing system housed in the chassis;
  a memory system that is coupled to the processing system and that includes instructions that, when executed by the processing system, cause the processing system to provide a switch engine that is configured to perform network switch functions in a local area network; and
  programmable hardware primitives utilizing a domain specific, protocol independent, target independent, and field reconfigurable programming language to provide programmable data plane hardware that is housed in the chassis and that integrates each of:
    at least one communications port that is configured to couple to a plurality of server devices;
    a server device table that is configured to include health information about the plurality of server devices; and
    a load balancing engine that is configured to:
      receive data plane traffic that is directed to the plurality of server devices through the at least one communication port;
      determine that a source of the data plane traffic that is directed to the plurality of server devices enables load balancing functionality and, in response, perform health based load balancing on the data plane traffic using the health information about the plurality of server devices in the server device table;
      forward, based on the health based load balancing, the data plane traffic to one of the plurality of server devices;
      disable load balancing functionality when the source of the data plane traffic is a switch; and
      cause the switch engine to perform the network switch functions to forward the data plane traffic.

7. The IHS of claim 6, wherein the load balancing engine receives the data plane traffic through the communication port from a router device, and wherein the router device is the source of the data plane traffic that enables load balancing functionality.

8. The IHS of claim 6, wherein the load balancing engine receives the data plane traffic through the communication port from a first server device of the plurality of server devices and the first server device is the source of the data plane traffic that enables load balancing functionality, and wherein the load balancing engine is programmable to forward the data plane traffic to a second server device of the plurality of server devices in response to performing the health based load balancing on the data plane traffic.

9. The IHS of claim 6, wherein the load balancing engine is programmable to store state information related to the forwarding of the data plane traffic to the one of the plurality of server devices, and forward the state information to a switch device in the local area network.

10. The IHS of claim 6, wherein the health information about the plurality of server devices includes Transport Control Protocol (TCP) connection information describing the number of TCP connections provided for each of the plurality of server devices.

11. The IHS of claim 6, wherein the load balancing engine is programmable to retrieve the health information from each of the plurality of server devices.

12. A method for performing programmable data plane hardware load balancing, comprising:
  performing, by a first switch device, network switch functions in a local area network;
  receiving, by a load balancing engine integrated into programmable data plane hardware included in the first switch device through at least one communications port integrated into the programmable data plane hardware of the first switch device, data plane traffic that is directed to a plurality of server devices, wherein the programmable data plane hardware is provided by programmable hardware primitives utilizing a domain specific, protocol independent, target independent, and field reconfigurable programming language;

determining, by the load balancing engine, that a source of the data plane traffic that is directed to the plurality of server devices enables load balancing functionality and, in response, performing health based load balancing on the data plane traffic using health information about the plurality of server devices that is stored in a server device table integrated into the programmable data plane hardware;

forwarding, by the load balancing engine through the at least one communications port, the data plane traffic to one of the plurality of server devices in response to performing health based load balancing;

disabling, by the load balancing engine, the load balancing functionality when the source of the data plane traffic is a second switch; and perform, by the load balancing engine, the network switch functions to forward the data plane traffic.

13. The method of claim 12, wherein the data plane traffic is received through the communication port from a router device, and wherein the router device is the source of the data plane traffic that enables load balancing functionality.

14. The method of claim 12, wherein the data plane traffic is received through the communication port from a first server device of the plurality of server devices that is the source of the data plane traffic that enables load balancing functionality, and wherein the data plane traffic is forwarded to a second server device of the plurality of server devices in response to performing the health based load balancing.

15. The method of claim 12, further comprising:
storing, by the load balancing engine, state information related to the forwarding of the data plane traffic to the one of the plurality of server devices; and
forwarding, by the load balancing engine, the state information to a second switch device.

16. The method of claim 12, wherein the health information about the plurality of server devices includes Transport Control Protocol (TCP) connection information describing the number of TCP connections provided for each of the plurality of server devices.

17. The method of claim 12, further comprising:
retrieving, by the load balancing engine, the health information from each of the plurality of server devices.

* * * * *